United States Patent [19]

Uhlinger et al.

[11] 4,043,102
[45] Aug. 23, 1977

[54] SAFETY FEATURES FOR REAR BAGGING MOWER

[75] Inventors: Charles E. Uhlinger, Des Moines; Clair D. Splittstoesser, Ankeny, both of Iowa

[73] Assignee: AMF Incorporated, White Plains, N.Y.

[21] Appl. No.: 684,027

[22] Filed: May 7, 1976

[51] Int. Cl.² .................................. A01D 35/26
[52] U.S. Cl. ............................... 56/17.4; 56/202
[58] Field of Search ............... 56/202, 320.2, 17.4, 56/10.5

[56] References Cited

U.S. PATENT DOCUMENTS

| 3,568,421 | 3/1971 | Smith et al. ................. 56/202 X |
| 3,750,378 | 8/1973 | Thorud et al. ............... 56/320.2 X |

FOREIGN PATENT DOCUMENTS

| 1,429,567 | 3/1976 | United Kingdom ................. 56/202 |

Primary Examiner—Jay N. Eskovitz
Attorney, Agent, or Firm—George W. Price; Walter Lewis

[57] ABSTRACT

In a rear bagging mower the rear discharge is automatically closed by a door unless the bag is locked in grass catching position, and the bag and door cooperate with an engine kill switch so that the engine will run only if the door is closed or the bag in grass catching position.

9 Claims, 8 Drawing Figures

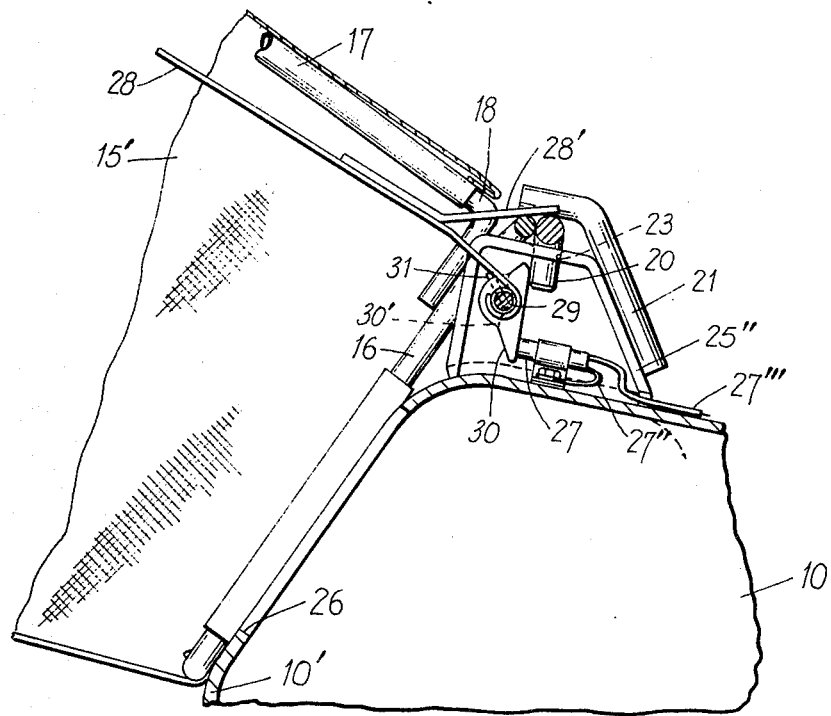
FIG. 4
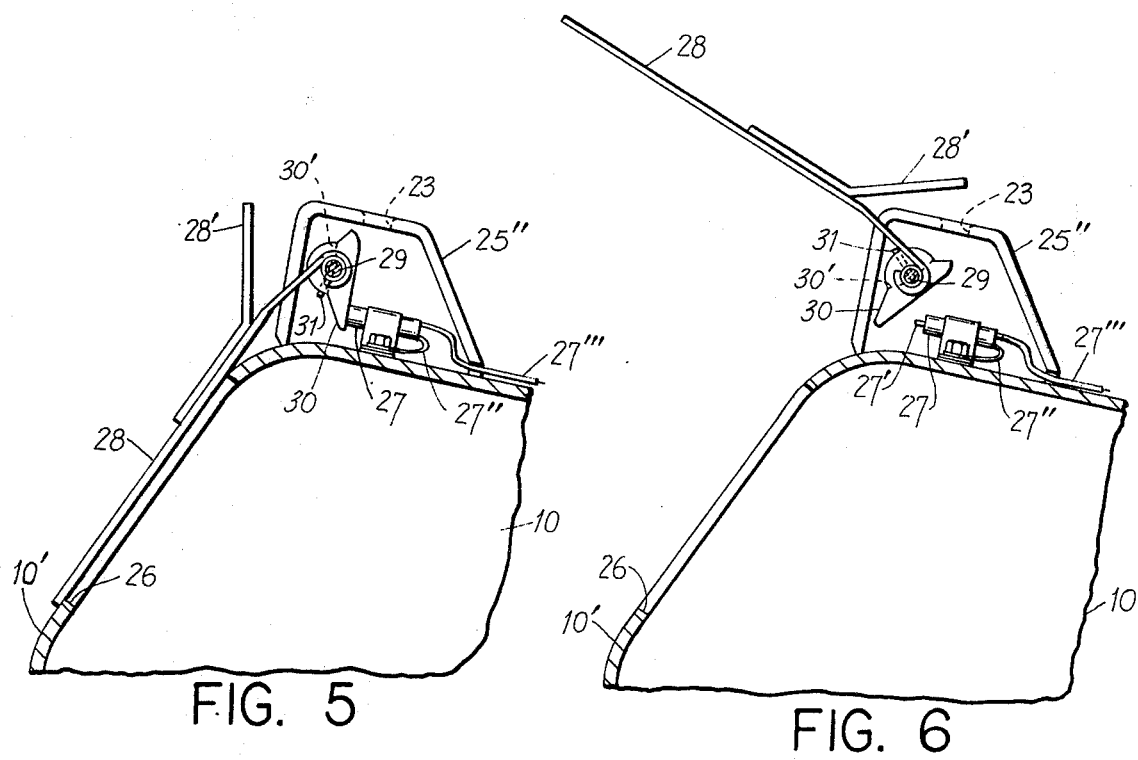
FIG. 5
FIG. 6

SAFETY FEATURES FOR REAR BAGGING MOWER

This invention relates to safety features for a rear bagging mower.

It is an object of this invention to provide a rear discharging and bagging lawn mower which is safe for the operator.

Briefly, in the invention means are provided for locking the bag in position and locking a door for the rear discharge open when the bag is in position, and an engine-kill switch which automatically turns the engine off except when the bag is in place of the door closed if the bag is not in place.

The invention will be described in connection with the accompanying drawings in which FIG. 1 is a perspective view of a rotary lawn mower embodying the invention;

FIG. 4 is a broken away enlarged side elevation view showing the position of the parts when the bag is in position and the rear door open;

FIG. 5 is a view similar to FIG. 4 but showing the bag removed and door closed;

FIG. 6 is a view similar to FIGS. 4 and 5 but showing the bag removed and door open;

Figure 1:
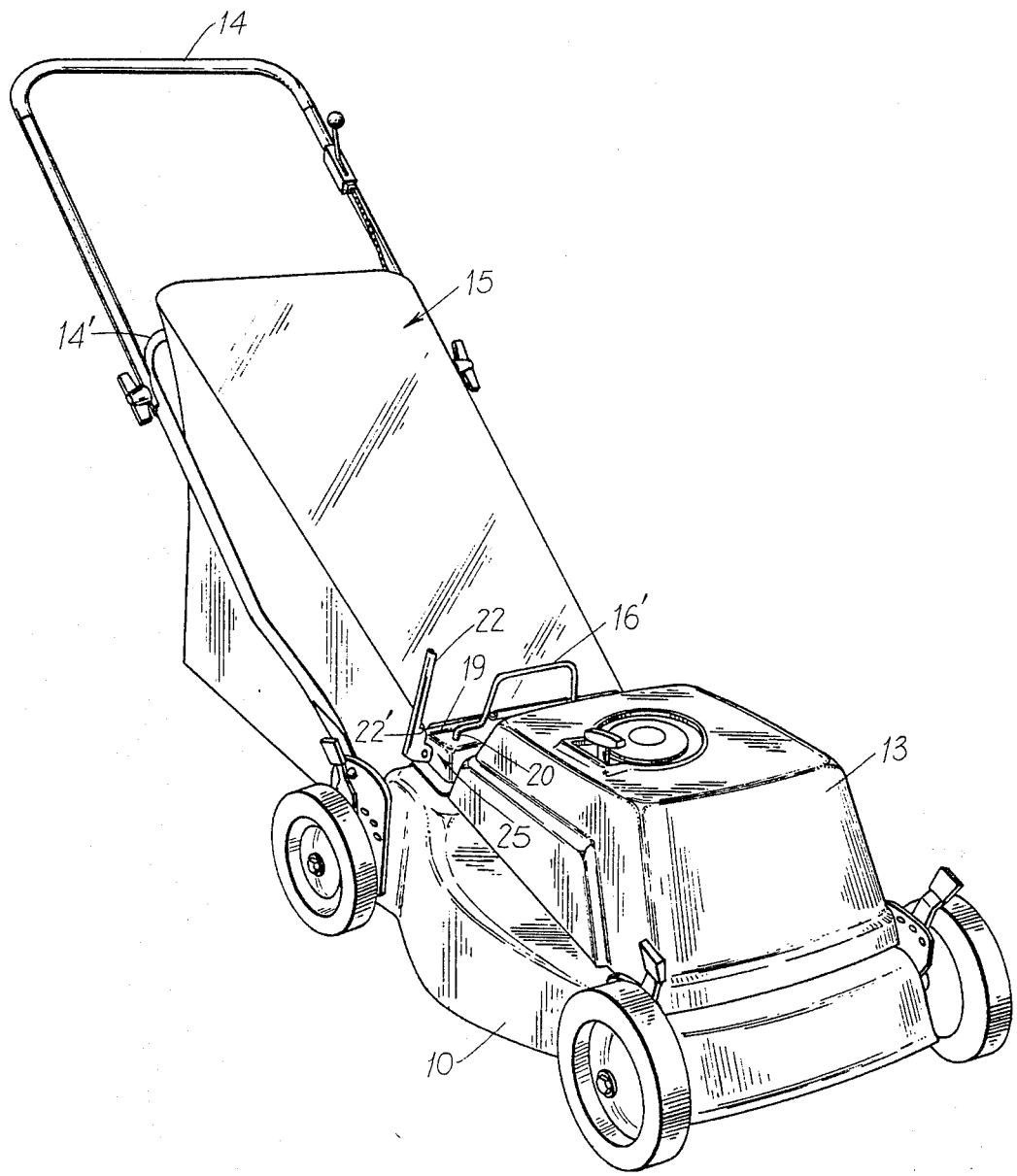
Figure 3:
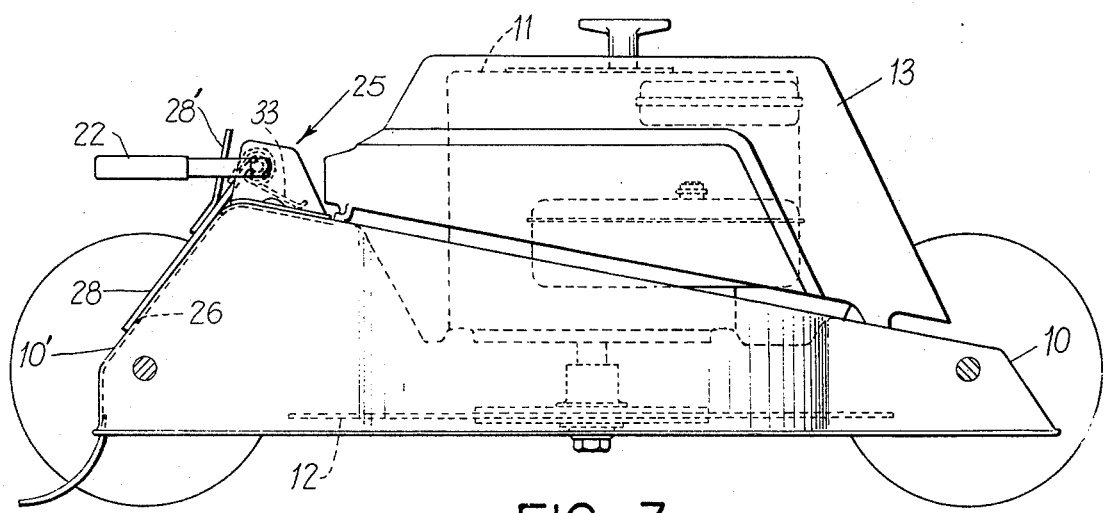
FIG. 3 is a partial side elevation view.

Referring now first to FIG. 1, illustrated therein is a rotary type lawn mower comprising a wheeled, skirted deck 10 having a gasoline engine 11 (see FIG. 3) on the top thereof and a rotary blade 12 below the deck. The engine is enclosed by a hinged engine shroud 13 which is the subject matter of copending mechanical patent application Ser. No. 684,387 and design patent application Ser. No. 684,389 both filed on the same date as the instant patent application.

Figure 8:
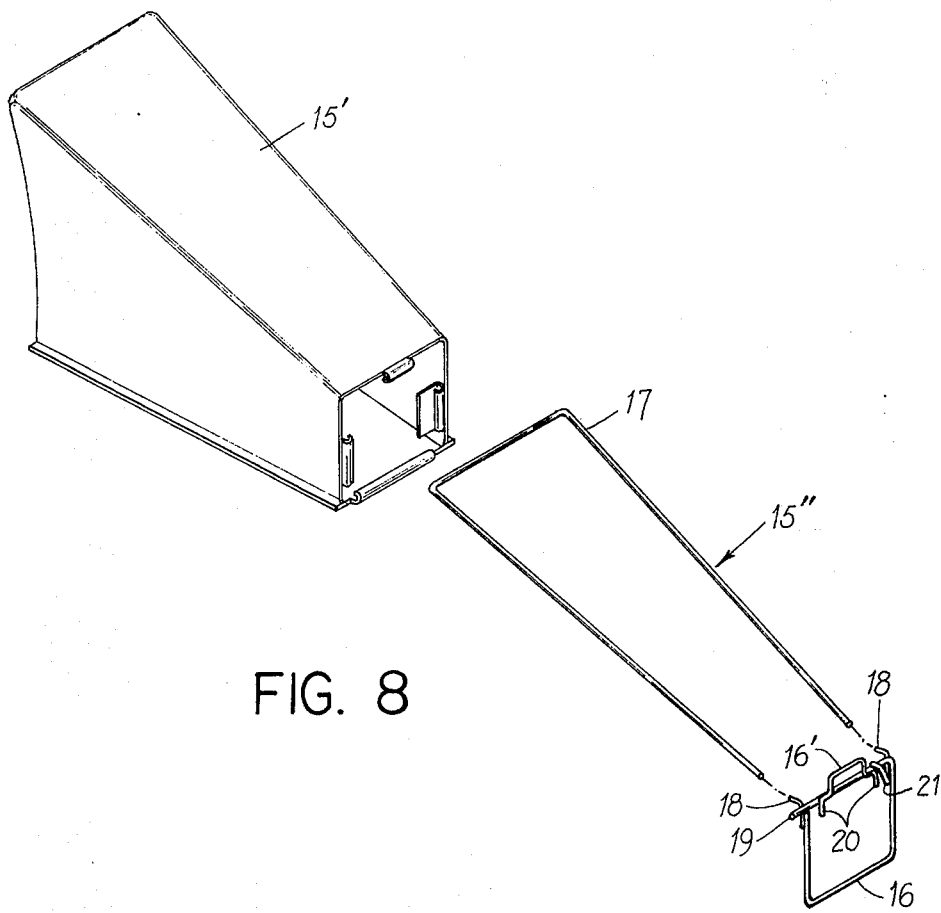
FIG. 8 is an exploded view of the grass catcher bag and frame.

A U-shaped rear handle 14 is provided for the mower, and a grass catcher 15 is positioned within the handle. As contrasted to a side mounted grass catcher, this enables the mower to come in close to bushes from along either side thereof. As seen from FIG. 8, the grass catcher comprises an air permeable woven fabric bag 15' and a metal frame 15''.

Figure 2:
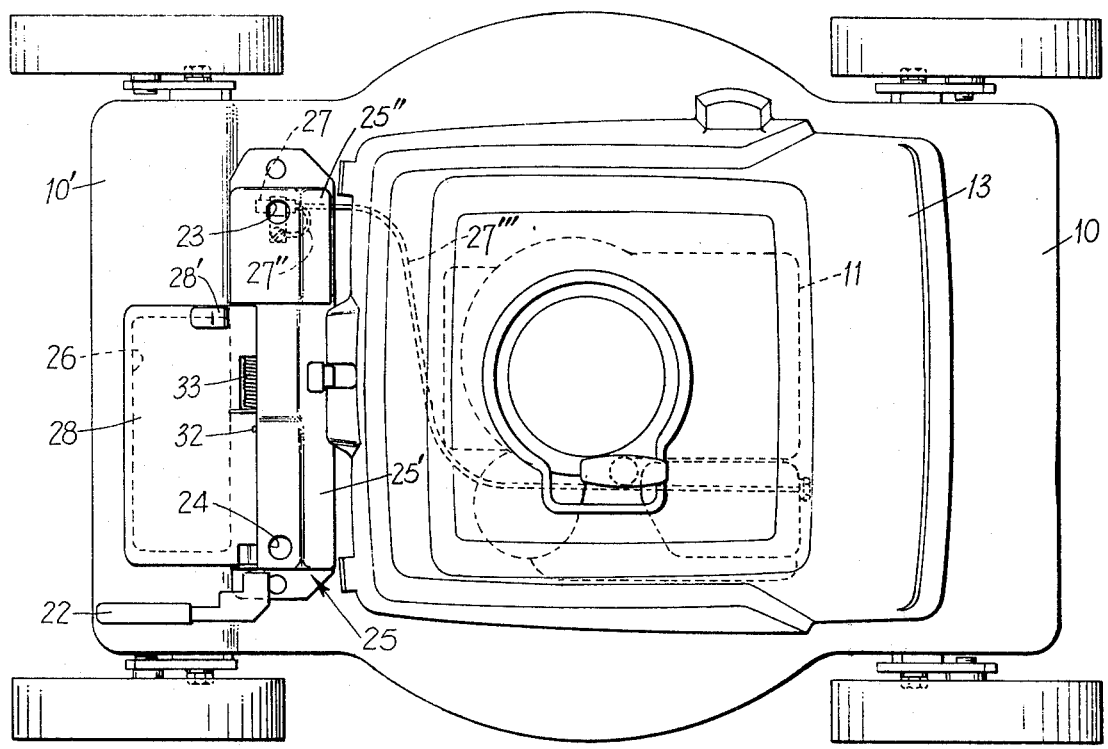
FIG. 2 is a partial top view.

The bag frame 15'' comprises a front rectangular shaped member 16 and a rear U-shaped member 17 which are joined together. Member 17 is bent to shape from tubular stock, and the member 16 has two rearwardly extending fingers 18 which enter the tubular stock to join the parts 16 and 17 together. Member 16 also has a grass catcher front handle portion 16', and other fingers 19, 20 and 21. The side extending finger 19 cooperates with a handle 22 (see FIG. 1) in a manner and for purposes to be described hereinafter. The two down extending fingers 20 cooperate with two holes 23 and 24 (see FIG. 2) formed in a housing 25 located at the rear of deck 10 for purposes also to be described hereinafter. The front finger 21 cooperates with housing 25, see FIG. 4. Briefly, when the grass catcher 15 is in grass catching position, the part 16 rests on the rear sloping skirt portion 10' (see FIG. 4) of the deck and surrounds a rear discharge opening 26 in the deck, the fingers 20 are in the holes 23 and 24, and the finger 21 rests on the front sloping surface of the housing 25. This arrangement makes for very easy removal and quick sand accurate installation of the grass catcher with respect to the mower. To remove the grass catcher it is only necessary to lift the same off the mower, and the reverse to position it in place. The grass catcher fits between the leg portions of the handle 14 and the upper rear part of the grass catcher overlies the intermediate handle part 14' of the handle. The mower has to have a handle 14 in any event, so as contrasted to a side extending grass catcher, in the invention the rear grass catcher does not occupy any extra space, but merely uses the existing space already required by the mower handle.

Referring now particularly to FIGS. 2-7, besides the purposes for the housing 25 already briefly mentioned, the housing 25 also serves an an exclosure for an engine kill switch 27 and as a means for pivotally mounting a closure flap or door 28 for the rear mower discharge opening 26. The housing 25 actually comprises two generally trapezoidal shaped pieces 25' and 25'. The piece 25' is open at the rear thereof and a pivot shaft 29 for the door 28 mounted in the ends thereof. The piece 25'' serves as an enclosure for the kill switch 27 and its operator 30 which is on the end of the shaft 29 which protrudes into the housing part 25''. The other end of shaft 29 has the handle 22 affixed thereto.

The switch 27 has a rear protruding movable operator button 27' (see FIG. 6) which is normally biased by a not shown internal spring to the rear protruding position shown, which is the contacts closed position for the switch. The switch has two leads 27'' and 27''' connected thereto that go the engine and deck, and when the button 27' is in the out or swtich contacts closed position shown in FIG. 6, the engine is automatically shut off by grounding the electrical circuit therefor, as will be readily understood by those skilled in the art. In addition, it will be appreciated that this same power disabling approach can be used should the blade 12 be driven by an electric motor rather than an internal combustion engine. In FIG. 6, since the bag is not in place, for sefety reasons when the door 28 is opened, it is desirable to automatically kill the engine. By contrast, in the FIGS. 4 and 5 position, either the bag is in position or the door closed, so it is safe for the engine to be running. In these two positions, the operator 30 is held in position to hold the switch 27 open, whereas this is not true in FIG. 6.

The operator 30 is a plastic piece on the shaft 29 just above the switch 27. Operator 30 is held on the shaft 29 by a pin 31 which protrudes into a slot 30' in a back half of the operator 30. When the bag is in position (see FIG. 4), the finger 20 protrudes through the hole 23 to engage the top front edge of operator 30 so that it cannot move clockwise to permit the switch button 27' to protrude to the switch contacts closed position. In FIG. 5 the grass catcher is removed, but the door is closed. Since the door is closed, the pin 31 is engaged with the bottom edge of slot 30'. In this position of the parts the switch 27 is still held in the contacts open position. That is to say, even though the bag is removed, since the door is closed it is safe for the engine to continue to run. By contrast, in FIG. 6 the bag is absent, so also is the finger 20; and since the door is open, the pin 31 has moved up so there is nothing holding the operator 30 against the switch 27. Therefore, the operator 30 is free to be swung out of the way by the spring biased switch button 27'. Accordingly, when neither the bag is in position nor the door closed, switch 47 automatically moves to its normal contacts closed position to disable the engine.

As heretofore stated, the door 28 is mounted on the door shaft 29. These two parts are affixed to each other by a pin 32 so that they move in unison. In addition, a coil spring 33 surrounds shaft 29 with opposite ends engaging the top of the door and deck, so that the door is constantly spring biased to the shut or closed position. This is true except under one condition, and that is if the grass catcher is locked in grass catching position. In this condition, the door is restrained from swinging shut by virtue of interlocking engagement between the handle 22 and side finger 19 of the grass catcher, but at this time, the grass catcher is positively locked in its illustrated grass catching position. That is to say, it cannot accidentally come off. It can only be intentionally removed, but if this is done, the interlock between the handle 22 and side finger 19 must be broken, and when this happens there is nothing to restrain the door 28 from automatically returning to its closed position.

Figure 7:
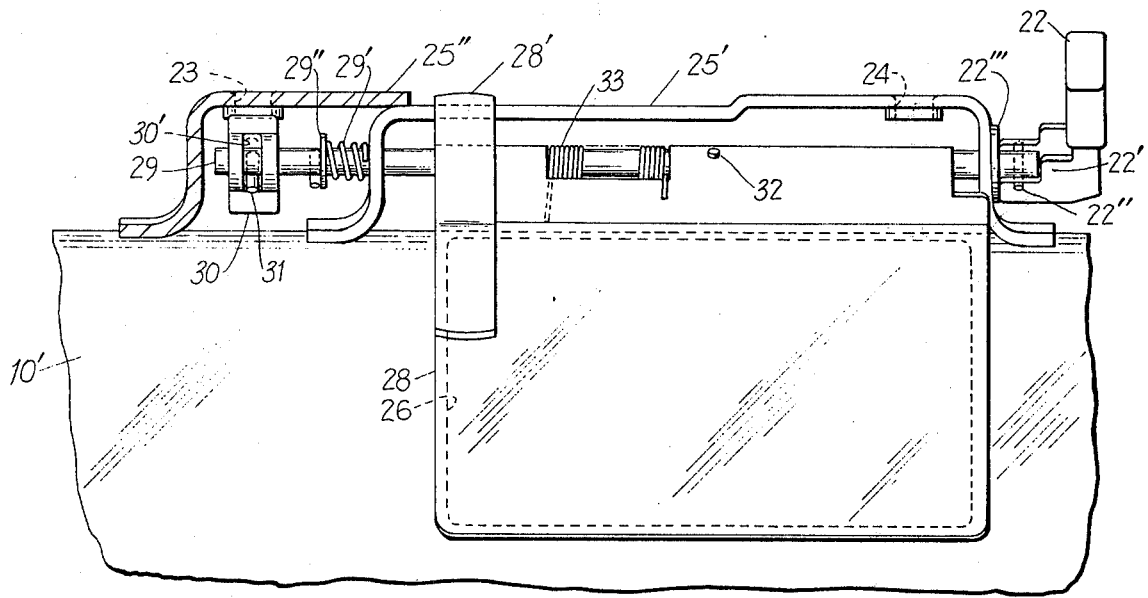
FIG. 7 is a rear view of FIG. 5.

As can be seen from FIG. 7, the back side of door 28 has a forwardly projecting finger 28' thereon. This finger 28' is actually a grass catcher locksing tab. The grass catcher can be mounted on the mower simply by dropping the same into position. The grass catcher is held at the front by the handle 16' and at the rear by the upper rear edge thereof. When it is lowered, the finger 21 slides down on the front slope of the housing 25 and the frame 16 on the rear slope of the deck skirt, so that it is almost impossible for the fingers 20 to miss the holes 23, 24 in the housing 25. In this position of the device, see FIG. 4, the finger 20 strikes the operator 30 to continue to disable the switch 27 from disabling the engine. When the handle 22 is swung up to open the door 28, the tab 28' moves up and forward to over the top cross part of bag frame part 16, see FIG. 4. When tab 28' is positioned above the top cross part pf bag frame part 16, the fingers 20 are retained in the holes 23, 24 and the grass catcher locked in grass catching position provided the handle 22 is moved to first clear and then interlock with the side finger 19 so that the door does not swing back to closed position. By viewing FIG. 1, it will be appreciated that after handle 22 is rocked up, it must then be rocked out to align its bottom U-shaped part 22' opposite the outer end of finger 19. The handle U-shaped part 22' is pivotally connected to the outer end of shaft 29 adjacent the contiguous end of housing 25' by pin 22''. The other end of shaft 29 has a coil spring 29' bearing against the other contiguous end of housing 25'. Actually a washer 22''' is located between part 22'' and housing 25' and the spring 29' is positioned between housing 25' another washer 29''. After the handle 22 is swung up, it will first strike finger 19. At this point, the handle 22 is rocked out slightly about part 22' to pull the shaft 29 slightly to the right (see FIG. 7) against its bias spring 29'. When this happens part 22' is clear of the outer end of finger 19 so that the handle can be moved up just slightly further so that the outer end of finger 19 is lined up between the opposite sides of U-shaped handle part 22'. If the handle is then released, the spring 29' will move the shaft 29 back to the left whereby the outer end of finger 19 is actuallly positioned between the opposite sides of the U-shaped handle part 22'. In this position of the parts 19 and 22' the grass catcher 15 is positively locked on the mower. By virtue of the lock tab 28' it cannot be removed unless the handle is first rocked out and down to clear part 22' from th outer end of finger 19. At this point, since the handle 22 is then free of finger 19, the spring 33 will return the door to closed position, see FIG. 5, and the tab 28' will clear the frame 16. The grass catcher can then be lifted off the mower, but this is perfectly safe because the door is closed so that no debris, stones, etc., can be expelled out of the opening 26 even though the engine continues to run. If at this stage one attempts to open the door, see FIG. 6, which is unsafe with the bag not in position, the switch 27 will shut the engine off.

It will now be seen that in addition to safety features, the invention also provides convenience of use features in terms of easy installation and removal of the grass catcher. The bag has only to be dropped in place of lifted off, and to lock or unlock the grass catcher, only the handle 22 has to be operated, and that entails only simple straightforward movements. However, all this is interrelated with the safety features, which automatically flow from operation of the handle and removal or installation of the bag. Thus, the bag cannot be removed unless the handle is first unlocked to permit the door 28 to return to closed position, and if the bag is absent, the door cannot be opened without shutting off the mower. For the door to be opened with the mower running, the grass catcher bag first has to be put back on the mower and locked in position.

We claim:

1. In a rotary lawn mower having a deck, a grass cutting blade below said deck, power means on said deck for rotating said blade, a rear discharge opening in said deck, a rearwardly extending mower handle connected to said deck, and a removable grass catcher positioned behind said mower between said mower handle and opening to collect grass clippings expelled through said opening; improved safety means for said mower, said safety means comprising a door for said opening, means constantly biasing said door to closed position, means for locking said grass catcher on said mower, means for locking said door open after said grass catcher is first locked on said mower, and means for automatically turning said power means off in response to opening of said door unless said grass catcher is first positioned on said mower, a handle for opening said door, and each of said last mentioned three means being operable in response to movement of said handle.

2. In a mower as in claim 1, wherein said mower handle has a U shape, and said grass catcher being positioned within said U shape.

3. In a mower as in claim 2, a pivot shaft, said door and door handle being mounted on said shaft, said grass catcher locking means comprising a tab on said door which engages a portion of said grass catcher when said door is moved to open position by said door handle.

4. In a mower as in claim 3, said door locking means comprising a portion of said door handle which is adapted to be interlocked with another portion of said grass catcher after said door handle is first moved to engage said door tab with said first mentioned grass catcher portion.

5. In a mower as in claim 4, said power off means comprising a switch connected to said power means and located adjacent to said shaft, said switch having power means on and off positions, a switch operator on said shaft, a third portion of said grass catcher being adapted to engage said switch operator to retain said switch in power means on position when said grass catcher is positioned on said mower, and a pin on said shaft which is adapted to engage said switch operator to retain said switch in power means on position solely when said door is closed, whereby said switch is released to power means off position in response to opening movement of said door handle unless said grass catcher is first positioned on said mower.

6. In a mower as in claim 5, a housing for said shaft and switch, said housing being positioned crosswise of said deck behind said power means, said switch operator being positioned inside said housing above said switch, a hole formed in said housing above said switch operator, said grass catcher comprising a hollow frame and a bag over said frame, said frame having a rectangular shaped forward grass catcher opening portion, one side of said grass catcher opening portion resting on said housing and the other sides resting on the rear of said deck about said discharge opening when said grass catcher is positioned on said mower, said one side comprising the mentioned grass catcher portion which is engaged by said door tab, said another grass catcher portion which is engaged by said handle comprising a laterally extending finger on said grass catcher opening portion, and said third grass catcher portion comprising a downwardly extending finger on said grass catcher opening portion one side which is adapted to enter said hole to engage said switch operator.

7. In a mower as in claim 6, wherein said hole is formed at one end of said housing, and another hole is formed in said housing at the other end thereof, said frame having another finger thereon similar to the downwardly extending one, and said another finger being adapted to enter said another hole.

8. In a mower as in claim 7, wherein said grass catcher is positioned on said mower by first lowering the same to enter said downwardly extending fingers into said holes and then operating said door handle to lock the grass catcher on the mower, and said grass catcher is removed from said mower by first operating said door handle to unlock the grass catcher from the mower and then raising the grass catcher to remove the downwardly extending fingers from the holes.

9. In a mower as in claim 8, said mower handle comprising a U-shaped member having two free ends joined at their opposite ends by a cross member, the free ends being connected to the rear of said mower and the cross member being positioned behind the grass catcher, said grass catcher being positioned on said mower inside said U-shaped mower handle with the rear end of said grass catcher overlying said cross member, and a grass catcher handle on the front end of said grass catcher, said grass catcher being lowered and raised into mower mounted and mower removed positions respectively by manually gripping said grass catcher handle and the rear end of said grass catcher which overlies said cross member.

* * * * *